United States Patent Office 2,766,843
Patented Oct. 16, 1956

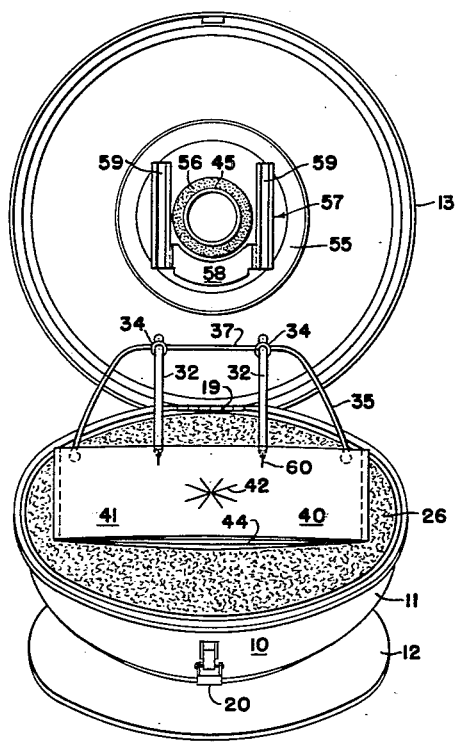
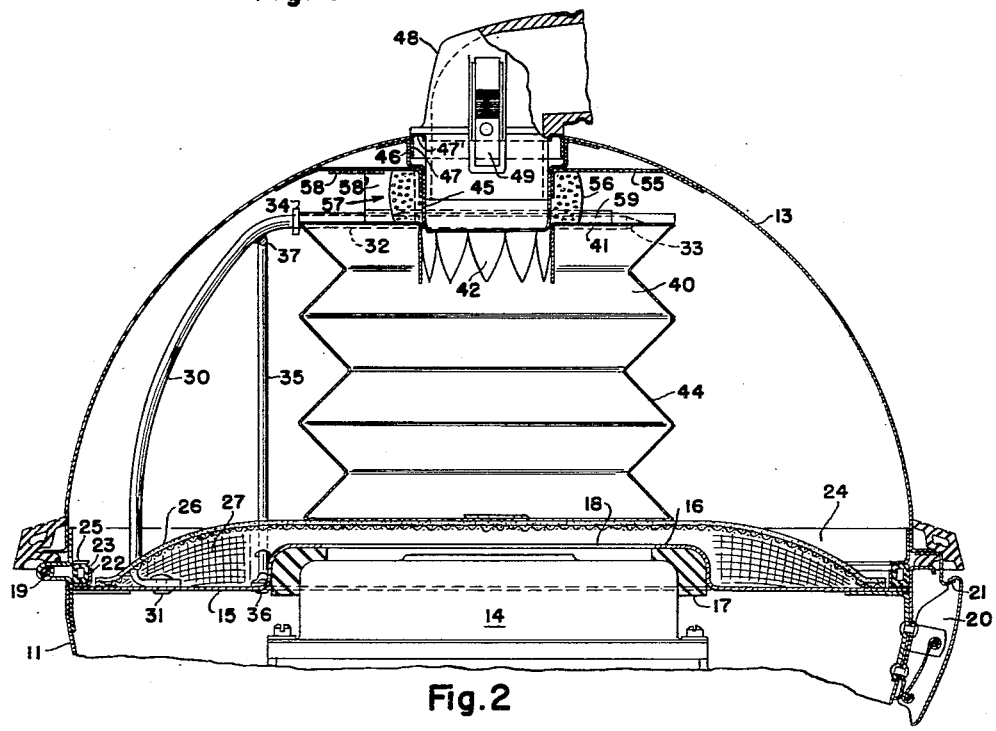

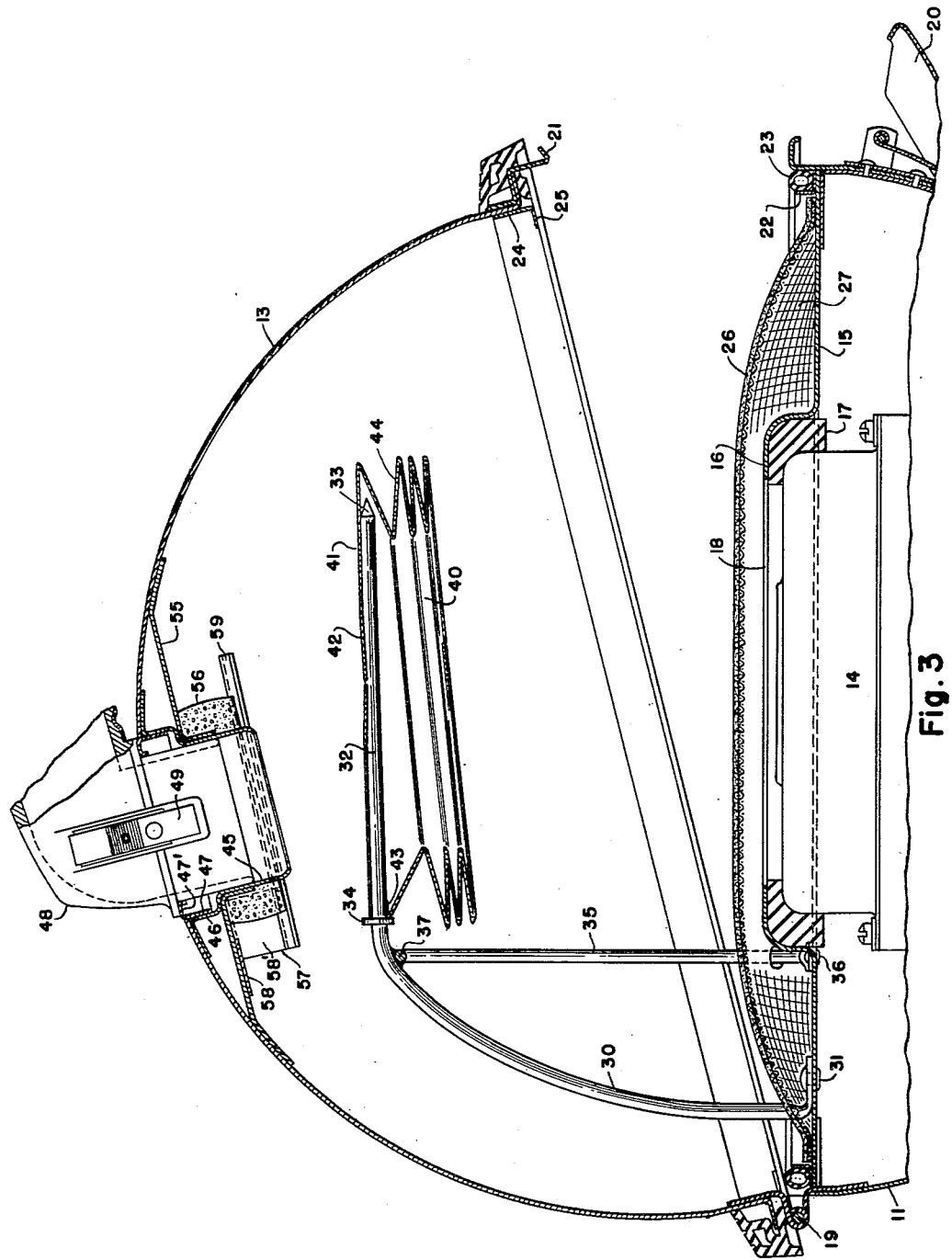

2,766,843

FILTER MOUNTING MEANS

Curtis C. Coons, North Canton, Ohio, assignor to The Hoover Company, North Canton, Ohio, a corporation of Ohio Application September 3, 1954, Serial No. 454,118

16 Claims. (Cl. 183—37)

The instant invention relates to suction cleaners and more particularly to a novel means for mounting a filter bag therein.

It is the prime object of the instant invention to provide a novel structure for mounting a filter bag in a suction cleaner, and for securing it in operative position therein.

It is another object of the instant invention to provide a novel mounting structure for a filter bag in a suction cleaner, including means for clamping the filter bag to the supporting structure in position to engage the air inlet conduit of the suction cleaner with the mouth of the filter bag.

It is a further object of the instant invention to provide a novel structure for mounting a filter bag in a suction cleaner in which the mounting means for the filter bag is adapted to pierce the filter bag and to be disposed in contiguity to a wall thereof containing the filter bag mouth, the piercing means supporting the wall of the filter bag and the mouth in position to be engaged by the air inlet conduit of the suction cleaner.

Still another object of the instant invention is to provide a novel structure for mounting a filter bag in a suction cleaner including a pair of supporting pins adapted to be inserted into the filter bag in contiguity to a wall thereof with the filter bag mouth disposed between the pins, and clamping elements for engaging the filter bag on the pins to clamp the filter bag in position to be engaged by the air inlet conduit of the cleaner. The clamping elements are effective to clamp said filter bag wall to the pins in a taut condition so that a sealing ring may be seated thereagainst to provide a seal at the junction of the air inlet conduit and the filter bag mouth.

It is also an object of this invention to provide a novel means for mounting a filter bag in a suction cleaner which is simple in its construction and which facilitates the application of the filter bag to the suction cleaner.

Further objects and advantages of this invention will be readily apparent to those skilled in the art from a consideration of the detailed description of a preferred embodiment thereof which follows, reference being had to the drawings in which:

Fig. 2 is a sectional view on the line 2—2 in Fig. 1;

Fig. 3 is a view of the suction cleaner corresponding to Fig. 2, showing the air inlet conduit separated from the filter bag mouth; and Fig. 4 is a perspective view of the suction cleaner incorporating the instant invention.

Figure 1:
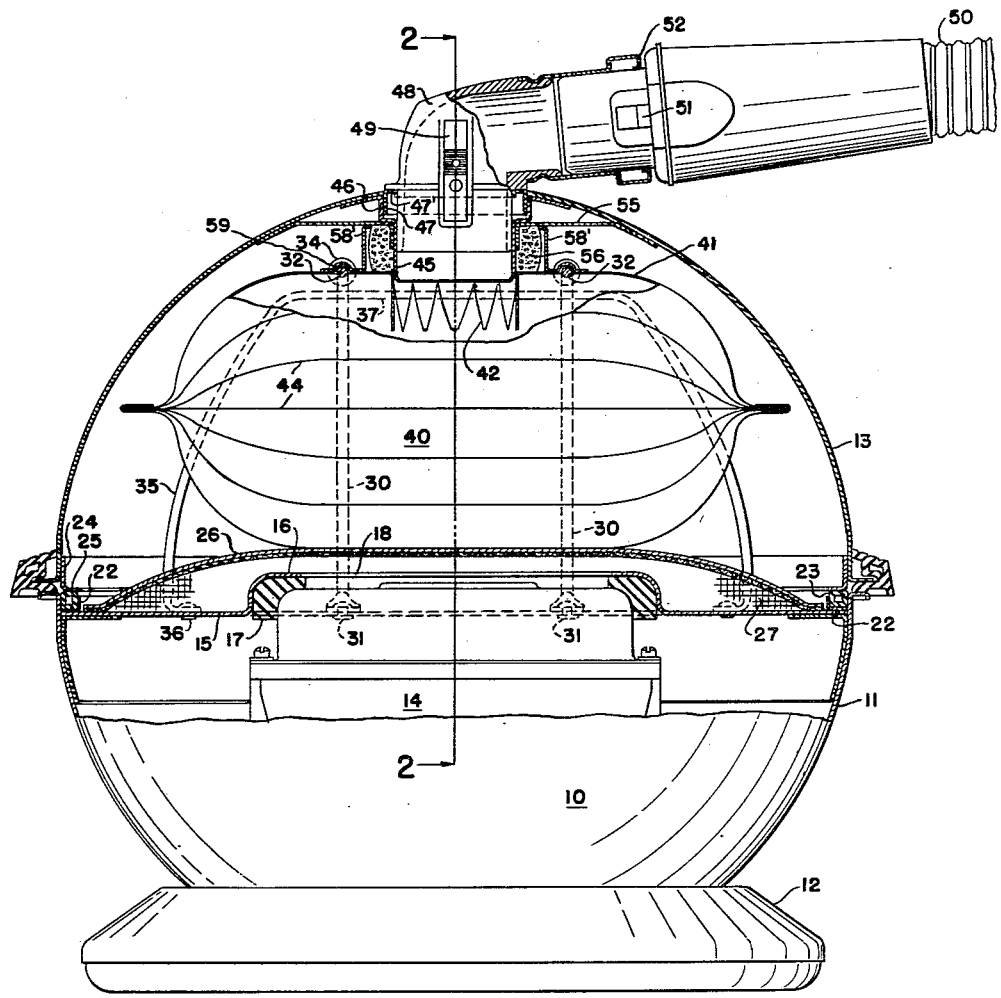
Fig. 1 is an elevational view, partly in section, of a suction cleaner embodying the instant invention.

The instant invention in a filter bag mounting means is illustrated in a preferred embodiment thereof as applied to a spherical suction cleaner 10 having a lower hemispherical section 11 supported on a suitable base 12 and an upper hemispherical casing section 13 separably joined to the lower casing section 11 on a horizontally disposed diametrical line. A motor-fan unit 14 for creating a suction flow of air is centrally located and suitably supported within the lower casing section 11. A partition or bulkhead 15 covers the lower casing section 11 and includes a recessed central portion 16 providing a seat for an annular resilient gasket 17 against which the top of the motor-fan unit 14 bears. The major area of the recessed central portion 16 of the partition 15 is cut away to leave an opening 18 for communication between the fans of the motor-fan unit 14 and the filter bag 40.

The lower and upper casing sections 11, 13 are connected by a hinge 19 permitting pivoting of the upper casing section 13 with respect to the lower casing section 11 for separation of said casing sections to provide access to the filter bag 40, and a conventional toggle latch 20 is provided on the lower casing section 11 opposite the hinge 19 to engage a lip 21 on the upper casing section 13 for joining said sections together.

An annular angle-section element 22 is secured to the upper side of the partition 15 adjacent the rim of the lower casing section 11 to provide an annular recess between the upstanding leg of the element 22 and the inner wall of the lower casing section 11 for seating an annular gasket 23 therein. The upper casing section 13 includes an annular angle-section element 24 having one leg thereof secured to the inside wall of said casing section with the other leg thereof extending laterally inwardly constituting a flange 25 depending slightly below the rim of the casing section 13, the flange 25 being positioned to bear on the annular gasket 23 to provide an air-tight seal between the two cleaner casing sections upon closing the one section on the other. The latch 20 serves to maintain the upper casing section 13 closed on the lower casing section 11, pressing the casing sections together to maintain the seal.

A dish-shaped secondary filter 26 supported by a wire mesh screen backing 27 is loosely supported on the partition 15 and covers the central opening 18 therein to close the lower casing section 11. The secondary filter 26 is impervious to dust and like litter to protect the motor-fan unit 14 from the accumulation of dirt impairing the efficiency thereof, but is pervious to air so as not to obstruct the passage of the air stream between the filter bag and the fans of the motor-fan unit. The secondary filter 26 also serves as a support for the bottom of the filter bag 40 as will be explained in greater detail below.

A pair of upstanding posts 30 are secured to the partition 15 by rivets 31 or the like and rise from the lower casing section 11 in spaced parallel relation to each other, arching inwardly in a shallow curve towards the vertical center line of the cleaner casing. Integrally formed with the top of each of the posts 30 is a laterally extending pin 32 having a piercing end 33 and including an integral stop collar 34 at the junction of the pin 32 with the post 30. A bracing arch 35 having its ends secured to the partition 15 by rivets 36 or the like rises from the partition, extending laterally of the posts 30 and lying thereunder, the arch having a flat central portion 37 disposed under the posts 30, each of the posts being secured thereto as by welding or the like for rigidly supporting them on the partition 15 and the lower casing section 11.

The present invention in a filter bag mounting means is adapted to utilize any one of a plurality of conventional filter bags, one form 40 being illustrated in the drawings. These filter bags are preferably of the disposable type, made of relatively inexpensive air pervious paper, adapted to be filled and discarded. The illustrated filter bag 40 is of a generally tubular configuration having the opposite ends sealed and comprising a number of accordion pleats 44 in the side walls permitting expansion of the filter bag as shown in Fig. 1 from its folded flat condition illustrated in Fig. 4, to utilize the full filter area of the bag. The top wall 41 of the filter bag includes a centrally disposed mouth 42 having a lanced opening.

The filter bag 40 is adapted to be mounted on the pins 32 by piercing an edge of the filter bag 40 with the pointed ends 33 and inserting the pins 32 thereinto in contiguity to the filter bag wall 41 with the filter bag mouth 42 centrally disposed between the pins 32. Upon piercing of the filter bag by the pins 32, the ruptured material 43 thereof will be folded inwardly around the pins 32, forming an air-tight seal at the junction of the pins 32 and the filter bag 40 to prevent the escape of dust and the like therefrom. The stop collars 34 limit the movement of the filter bag 40 onto the pins 32 so as to avoid piercing the opposite side of the filter bag, the length of the pins 32 beyond the stop collars 34 being less than the width of the wall 41 so that the pointed ends 33 thereof fall short of said opposite side. The stop collars 34 also serve to position the filter bag mouth 42 with respect to the air inlet conduit 45 so that the two will mate.

It will be apparent from further consideration of the description of the instant invention that the filter bag mouth 42 must always be centrally disposed between the supporting pins 32 and therefore the filter bag 40 cannot be haphazardly applied thereto. Accordingly, the filter bag 40 is imprinted or otherwise marked on its edge with positioning indicia 60 locating the points at which the pins 32 are to be inserted into the filter.

The filter bag 40 being mounted on the pins 32 will be suspended from the posts 30 to hang downwardly therefrom, the bag 40 being wholly disposed within the confines of the upper casing section 13. Upon the operation of the motor-fan unit 14 the filter bag will be expanded as illustrated in Fig. 1, and upon filling of the bag with dirt and like litter it will sag downwardly against the secondary filter 26 which supports the underside of the filter bag to prevent accidental rupturing of the bag due to the weight of the material contained therein. The secondary filter 26 also serves the function of keeping the filter bag 40 spaced from the central opening 18 in the partition 15 so that the suction pressure of the motor-fan unit 14 may be applied to the full area of the filter bag for most effective cleaning action.

Centrally disposed in the top of the upper casing section 13 is an air inlet conduit 45 formed with an enlarged diameter portion 46 adjacent the inner wall of the casing section, the conduit being secured thereto by welding or the like. An annular inverted L-section element 47 is secured within the enlarged diameter portion of the air inlet conduit to provide an inwardly directed latch engaging lip 47'. A hose connector 48 is received in the air inlet conduit 45 and includes a suitable spring pressed latch 49 for engaging the lip 47' formed by the L-section element 47 and swivelly securing the hose connector 48 therein in air-tight engagement with the air inlet conduit 45. A conventional cleaning tool hose 50 may be attached to the hose connector 48 by engagement of the spring pressed latch 51 thereof with the annular lip 52 formed at the outer end of the hose connector 48, in the manner well known in the art.

An auxiliary inner wall 55 presenting a flat surface is secured to the top of the upper casing section 13, as by welding or the like, surrounding the air inlet conduit 45. A soft annular sealing element 56, preferably made of rubber or like material, is seated on the auxiliary wall 55 surrounding the air inlet conduit 45. Secured to the auxiliary wall 55, adjacent to the sealing element 56, is a clamping element 57 for the filter bag. The clamping element 57 comprises a web 58 secured to the auxiliary wall 55 as by welding or the like, and laterally extending arms 59 depending from the web 58, the latter being complementally shaped to the pins 32 mounting the filter bag 40.

In accordance with the instant invention the two mounting pins 32 are symmetrically disposed with respect to the air inlet conduit 45 so that the mouth 42 of the filter bag will be located in alignment with said conduit 45. Upon closing the upper casing section 13, the nose of the air inlet conduit 45 will be telescoped into the mouth 42 of the filter bag 40. The clamping arms 59 are aligned with the supporting pins 32 so that concurrently with engaging the air inlet conduit 45 in the filter bag mouth 42, the arms 59 will fall upon the supporting pins 32 pressing the wall 41 of the filter bag 40 thereagainst to clamp the filter bag on the pins. It is to be noted that the arms are directed downwardly from the web 58 at a small angle to provide the pressure engagement between the arms 59 and the pins 32 to clamp the filter bag 40 to the latter, the elements having sufficient inherent resiliency to give under the pressure. The depending portions 58' of the web 58 are also yieldable and will give upon engagement of the arms 59 against the filter bag wall 41 and the pins 32.

Thus it will be seen that the central area of the filter bag wall 41 containing the filter bag mouth 42 will be tautly stretched between the pins 32. The sealing element 56 surrounding the air inlet conduit 45 abuts the tautly retained portion of the filter bag wall 41 and will bear down thereupon in opposition to the tension therein to provide the requisite air seal between the air inlet conduit 45 and the filter bag mouth 42 as is well known in the art.

It is to be understood that the foregoing is a description of a preferred embodiment of the invention and that modifications thereof falling within the scope of the invention will occur to those skilled in the art. Accordingly, it is not intended that the invention be limited except as set forth in the claims which follow.

I claim:

1. In a suction cleaner having a motor-fan unit for producing a suction flow of air, a filter bag having a mouth, and an air inlet conduit adapted to mate with the mouth of said filter bag, means in the cleaner adapted to pierce the material of said filter bag and project thereinto in contiguity to a wall thereof to support said wall and suspend the filter bag within the cleaner with the mouth thereof in position to be engaged by the air inlet conduit.

2. In a suction cleaner as recited in claim 1 in which the supported wall includes the filter bag mouth and the mounting means comprises a pair of spaced pins adapted to be disposed on opposite sides of the mouth of the filter bag to support said mouth in position to be engaged by the air inlet conduit.

3. In a suction cleaner as recited in claim 1 in which the supported wall includes the filter bag mouth and including means on the air inlet conduit adapted to abut the supported wall of the filter bag to provide an air-tight seal between the air inlet conduit and the filter bag mouth.

4. In a suction cleaner as recited in claim 1 including means adapted to engage the filter bag wall opposite the mounting means for securing the filter bag to the mounting means.

5. In a suction cleaner as recited in claim 1 in which the supported wall includes the filter bag mouth and the mounting means comprises a pair of spaced pins adapted to be disposed on opposite sides of the filter bag mouth to support said mouth in position to be engaged with the air inlet conduit, and including complemental means adapted to engage the filter bag wall opposite said pins upon engagement of the air inlet conduit with the filter bag mouth for securing the filter bag to the pins.

6. In a suction cleaner having two separable casing sections adapted to be joined to one another in sealed relation, a motor-fan unit contained in one of said casing sections for producing a suction flow of air, the second casing section being mounted on said one casing section for movement to a separated position with respect thereto and including an air inlet conduit, means for mounting a filter bag having a mouth in said suction cleaner comprising, means on said one casing section adapted to pierce the material of said filter bag and project thereinto in contiguity to a wall thereof to support said wall and suspending said filter bag within the cleaner with the mouth thereof in position to be engaged by the air inlet conduit upon joining the two casing sections.

7. In a suction cleaner as recited in claim 6 in which the supported wall includes the filter bag mouth and the mounting means comprises a pair of spaced pins supported on said one casing section adapted to be disposed on opposite sides of the filter bag mouth to support said mouth in position to be engaged by the air inlet conduit.

8. In a suction cleaner as recited in claim 6 in which the supported wall includes the filter bag mouth and including means on the air inlet conduit adapted to abut said supported wall of the filter bag to provide an airtight seal between the air inlet conduit and the filter bag mouth.

9. In a suction cleaner as recited in claim 6 including means on said second casing section adapted to engage the filter bag wall opposite said mounting means for securing the filter bag to the mounting means.

10. In a suction cleaner as recited in claim 6 in which the supported wall includes the filter bag mouth and the mounting means comprises a pair of spaced pins supported on said one casing section and adapted to be disposed on opposite sides of the filter bag mouth to support said mouth in position to be engaged with the air inlet conduit, and including complemental means on said second casing section adapted to engage the filter bag wall opposite said pins upon engagement of the air inlet conduit with the filter bag mouth for securing the filter bag to said pins.

11. In a suction cleaner as recited in claim 6 in which said mounting means comprises a pair of spaced pins each integral with an upstanding post secured to said one casing section, said pins extending substantially laterally of the posts for suspending the filter bag therefrom.

12. In a spherical suction cleaner having two separable hemispherical casing sections adapted to be joined to one another in sealed relation, a motor-fan unit contained in one of said casing sections for producing a suction flow of air, the second casing section being mounted on said one casing section for movement to a separated position with respect thereto and including an air inlet conduit, means for mounting a filter bag having a mouth in said suction cleaner comprising a pair of spaced pins each integral with an upstanding post secured to said one casing section, said pins and posts being disposed within said second casing section, said pins extending substantially laterally of said posts and being adapted to pierce the material of said filter bag and project thereinto in contiguity to a wall thereof having said filter bag mouth disposed therein to support said wall and the mouth of the filter bag in position to engage said mouth with the air inlet conduit upon joining the two casing sections, the filter bag being suspended from said pins within the confines of the second casing section.

13. In a suction cleaner as recited in claim 12 in which said one casing section includes a secondary filter adapted to be disposed under the suspended filter bag for supporting the bottom thereof in spaced relation to the motor-fan unit, and said second casing section includes means adapted to engage the filter bag wall opposite the pins upon mating the air inlet conduit with the filter bag mouth for securing the filter bag to said pins.

14. In a suction cleaner having a motor-fan unit for creating a suction flow of air and an air inlet conduit, means for mounting a filter bag having a mouth for engagement with the air inlet conduit comprising, means for supporting a wall of said filter bag having said mouth disposed therein, and means complemental to said supporting means for securing the area of said wall containing the mouth to the supporting means in a tautly stretched condition, the air inlet conduit including means abutting the tautly stretched portion of the filter bag wall to provide an air-tight seal at the junction of the air inlet conduit and the mouth.

15. In a suction cleaner as rectified in claim 14 in which the supporting means is disposed behind the filter bag wall and the securing means engages the wall opposite the supporting means in pressure engagement therewith.

16. In a suction cleaner as recited in claim 14 in which the supporting means comprises a pair of spaced pins disposed behind the filter bag wall on opposite sides of the mouth, and the securing means comprises complemental elements adapted to engage the filter bag wall opposite said pins.

References Cited in the file of this patent
UNITED STATES PATENTS

| | | |
|---|---|---|
| 1,437,996 | Robertson | Dec. 5, 1922 |
| 2,050,605 | Gordon et al. | Aug. 11, 1936 |
| 2,400,558 | Lindberg | May 21, 1946 |
| 2,574,683 | Anderson | Nov. 13, 1951 |